United States Patent [19]

Suen et al.

[11] 4,086,181

[45] * Apr. 25, 1978

[54] CONTROL OF CORROSION AND SCALE IN CIRCULATING WATER SYSTEMS BY MEANS OF PARTIAL ESTERS OF POLYFUNCTIONAL ORGANIC ACIDS

[75] Inventors: Tzeng Jiueq Suen, New Canaan; Arthur James Begala, Jr., Fairfield; Martin Grayson, Cos Cob, all of Conn.

[73] Assignee: American Cyanamid Company, Stamford, Conn.

[*] Notice: The portion of the term of this patent subsequent to Apr. 26, 1994, has been disclaimed.

[21] Appl. No.: 768,249

[22] Filed: Feb. 14, 1977

Related U.S. Application Data

[60] Continuation-in-part of Ser. No. 610,808, Sep. 5, 1975, Pat. No. 4,020,000, which is a division of Ser. No. 456,119, Mar. 29, 1974, Pat. No. 3,974,083.

[51] Int. Cl.$^2$ .............................................. C02B 5/06
[52] U.S. Cl. .................................. 252/180; 21/2.7 R; 252/8.55 E; 252/80; 252/387; 252/396; 560/91; 560/89; 560/198; 560/199; 560/182
[58] Field of Search .......... 252/180, 181, 396, 8.55 E, 252/389 A, 387, 80; 21/2.7 R; 260/485 P, 485 G, 475 A

[56] References Cited

U.S. PATENT DOCUMENTS

| | | | |
|---|---|---|---|
| 2,529,177 | 11/1950 | Nieland et al. | 21/2.7 R |
| 3,893,931 | 7/1975 | Sturwold et al. | 252/396 |
| 3,912,642 | 10/1975 | Sturwold et al. | 252/396 |
| 4,003,842 | 1/1977 | Suen et al. | 252/180 |
| 4,020,000 | 4/1977 | Suen et al. | 21/2.7 R |

*Primary Examiner*—George F. Lesmes
*Assistant Examiner*—Edith R. Buffalow
*Attorney, Agent, or Firm*—Gordon L. Hart

[57] ABSTRACT

For inhibiting corrosion and scale on ferrous metal parts in a circulating water system there is added to the water in such system from 10 to 500 ppm of a partial ester of a polyfunctional acid having a free carboxylate, phosphonate or sulfonate group and another carboxyl group which is esterified with a polyoxyalkylated derivative of an alkyl, alkaryl, or alkenyl alcohol having a terminal hydrocarbon group of 8-20 carbon atoms. In some preferred embodiments there is added with the partial ester from 10 to 500 ppm of a dispersible oil which may also include a surface active agent for dispersing the oil in water. Preferred partial esters include partial esters of citric, malic, tartaric, maleic, adipic and phthalic acids partially esterified with an alkyl polyoxyethylene alcohol having 2 to 4 ethoxy groups.

1 Claim, No Drawings

CONTROL OF CORROSION AND SCALE IN CIRCULATING WATER SYSTEMS BY MEANS OF PARTIAL ESTERS OF POLYFUNCTIONAL ORGANIC ACIDS

This is a continuation-in-part of copending Application Ser. No. 610,808 filed Sept. 5, 1975, now U.S. Pat. No. 4,020,000 which was filed as a division of the copending Application Ser. No. 456,119 filed Mar. 29, 1974, now U.S. Pat. No. 3,974,083.

The invention relates to circulating water systems and particularly to new additives for inhibiting corrosion and deposits on the metal tubes and other metal parts that contact circulating water in the system.

Additives for the purpose of controlling corrosion and scale in such systems are added to the circulating water, usually in extremely small proportions. The most widely used additives for this purpose have been metal compounds which have the disadvantages of toxicity and the consequent difficulty of disposal. Some nontoxic, biodegradable organic additives which have been proposed have some inhibiting effect, but they are usually less than satisfactory. Metal compounds such as those containing chromates are offered commercially for these purposes and are quite suitable for inhibiting corrosion and scale but such metal-containing additives may pose a water pollution problem if they are discharged into a natural watercourse. U.S. Pat. No. 2,529,177 proposed the addition of certain hydroxypolycarboxylic acids such as citric, malic, tartaric and mucic acids or their soluble salts in water systems for control of corrosion and tuberculation in the water pipes. That patent suggested that hydroxy-polycarboxylic acids may be attracted from the solution to metal surfaces in the system and would form, on the metal surfaces, a protective organic layer which, to some extent, does appear to inhibit corrosion and tuberculation. These additives have the advantages of non-toxicity and biodegradability but they are not sufficiently effective for practical control of corrosion and scale in most instances.

An object of the invention is to provide improvements in circulating water systems by means of certain organic compounds as additives which effectively inhibit corrosion and scale and which can be safely discharged into natural streams without danger of toxicity. The additives are effective for use in open systems, e.g. cooling tower systems, as well as in closed systems where the water is not contacted with air.

The invention provides the use of certain additives for control of corrosion and deposits in circulating water systems. The additives are used in very minor concentrations, usually in the range from about 10 to about 500 ppm in the circulating water. These additives are a class of organic compounds that have a combination of several functional moieties in the organic molecule, each such moiety being necessary or advantageous for the effective corrosion and scale inhibiting function of the additive. To provide an anchoring functional group in the molecule, the compound has an organic carboxylate or an organic phosphonate or an organic sulfonate radical. This radical functions to attract and hold (anchor) the organic molecule to the metal surfaces in the circulating water system. This anchoring effect is similar to that performed by a carboxyl radical in the hydroxypolycarboxylate additives that were described in U.S. Pat. No. 2,529,177.

In addition, however, the molecule of an additive compound used for the present invention has an oleophilic terminal hydrocarbon chain of 8–20 carbon atoms and this chain in itself enhances the inhibiting function of the additive and, in some embodiments, it functions to further improve the inhibiting effect when used in combination with an oil additive in the circulating water. This oleophilic terminal group in the compound can attract dispersed oil from the circulating water and hold it in the protective film which is formed by the compound on metal surfaces and this will even further enhance the inhibiting effect. When a very small proportion of the additive is dissolved in the circulating water, the additive will be attracted to or absorbed on metal surfaces and it will form an effective protective film on such surfaces. When a very small proportion, usually from about 10 to about 500 ppm of oil is also dispersed in the circulating water with the additive, the oleophilic moiety of the additive compound will attract some of the dispersed oil to the protective film and this will even further improve the protective function of the film on metal surfaces in the system.

The presence of a terminal hydrocarbon chain attached to the molecule as the oleophilic moiety will usually tend to insolubilize the compound. Since solubility of the compound in water is necessary for the proper functioning of the inhibitor, the compounds used for the invention further comprise a solubilizing moiety in addition to the other functional moieties described above.

In the molecule of a compound of the class defined, the oleophilic end group is a hydrocarbon radical having 8 to 20 carbon atoms selected from alkyl, alkenyl, cycloalkyl and aralkyl. This hydrocarbon group is connected in the molecule to a solubilizing group which is an oxyalkylene or a polyoxyalkylene chain having two or three carbon atoms in each oxyalkylene group and having one to five oxyalkylene groups in the solubilizing chain. The solubilizing group, in turn, is connected to a carboxyl group of a carboxylic acid or a polycarboxylic acid moiety which may also have one or more hydroxyl groups and which in some embodiments may have another carboxyl group which may be similarly connected with another alkyl oxyalkylene or alkyl polyoxyalkylene chain of the kind described. In addition, the polycarboxylic acid moiety must include the metal-attracting terminal group which is a member selected from carboxylate, phosphonate or sulfonate radicals having a cation such as hydrogen, a metal ion, an ammonium, alkylammonium or polyalkylammonium radical, or the like, which is capable of ionization in aqueous solutions.

Preferred compounds of the foregoing description can be expressed by the generic formula:

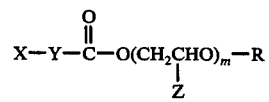

R is a hydrocarbon radical having 8 to 20 carbon atoms selected from alkyl, alkenyl, cycloalkyl and arylalkyl;

m is a value from 1 to 5;

Z is hydrogen or methyl;

Y is selected from alkylene or arylene having 2 to 8 carbon atoms,

wherein W is hydrogen or hydroxy, —CH=CH—,

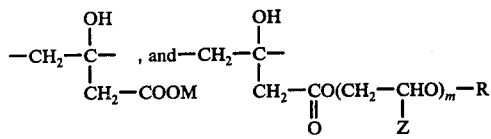

wherein $m$ and $Z$ are as defined before, and

M is selected from hydrogen, ammonium, alkylammonium, polyalkylammonium, alkali metal, or alkaline earth metal; and X is selected from COOM, PO(OM)$_2$ and SO$_3$M wherein M is as defined before.

For the described use as corrosion and scale inhibitors, preferred compounds selected from the class defined above are those in which R is alkyl having 8 to 18 carbon atoms, $m$ is 2–4, Z is hydrogen and X is carboxylate. These can be conveniently prepared by condensation of a polycarboxylic acid, including hydroxypolycarboxylic acids, having 2 to 3 carboxyl groups, with an alcohol or mixture of alcohols having the formula

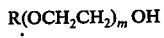

wherein

R is alkyl having 10 to 18 carbon atoms and $m$ has an average value in the range from 2 to 4; at least one carboxyl group is left unesterified. The preferred acids for the condensation are tartaric, malic, citric, succinic, adipic, phthalic, maleic acids and the like.

Preferred alcohols for the condensation are alkyl or alkaryl polyoxyethylene-alcohols such as an ethoxylated higher alkanol or alkylphenol having a terminal alkyl or alkylphenol group containing 10 to 20 carbon atoms and having an average of about three oxyethylene repeating groups in the polyether chain. Instead of oxyethylene, the repeating groups may be oxyisopropylene. The condensation products, which may be used either as the soluble acids or as soluble ionic salts of the acids, produce excellent inhibition of corrosion and scale when used alone as additives, and in many instances produce even more remarkable results when used in combination with a small amount of oil which is dispersed as an additional additive in the circulating water system.

Following is a description of the preparation of some of the preferred compounds of the class described and their use in a test apparatus that was designed for measuring the ability of the additive to inhibit corrosion and scale in typical circulating water systems.

EXAMPLES

I. Acid-Ester Preparation

A. To a reaction flask equipped with a stirrer and a reflux condenser are added 28.8 parts by wt. (0.15 mole) of anhydrous citric acid and 98 parts by wt. (about 0.3 mole) of a mixture of ethoxylated alcohols (sold under the tradename Alfonic 1014–40), of the structure R(OCH$_2$CH$_2$)$_m$OH (average number of C atoms in R = 12.6, average $m$ = 2.9, average mol wt. = 323), also 150 parts by wt. of methyl ethyl ketone (MEK) as diluent and 6.9 parts by wt. of boron trifluoride etherate as catalyst. The reaction is carried out under reflux at a temperature of about 87° C. for about 3 hours. MEK is then distilled off; the final pot temperature is 120° C. The distillation residue is the condensation product, called Product A. The acid number is 109 and the saponification number is 98.2 (mg KOH/g.). Calculated composition of the condensation product is 58 molar % of the monoester and 42 molar % of the diester.

B. Thirty parts by wt. (0.2 mole) of tartaric acid and 63.7 parts by wt. (0.2 mole) of Alfonic 1014–40 are reacted, in toluene which serves as an azeotropic agent, at 140°–150° C. until 3.6 parts (0.2 mole) of the water of condensation is distilled off. Toluene is then distilled off. The reaction product is further stripped of volatile material under vacuum (< 1 mm. pressure). The residue is the condensation product designated Product B. Its saponification number is 130 (theory 125).

C. Equimolar quantities of malic acid and Alfonic 1014–40 are reacted in a round bottom flask equipped with a stirrer, condenser, thermometer, and a nitrogen gas purge. The reaction is carried out at 110°–130° C. with the aid of some toluene for about four hours, and is stopped after the calculated weight of water of condensation is distilled off. The finished product has an acid number of 124 (theory 128) and a saponification number of 134 (theory 128). This product is designated Product C.

D. Equimolar quantities of malic acid and Alfonic 1412–40 are reacted directly in a reaction flask equipped with a stirrer, condenser, thermometer and a nitrogen purge. Alfonic 1412–40 is the tradename for a mixture of alcohols of formula C$_n$H$_{2n+1}$(OCH$_2$CH$_2$)$_3$ in which the average value of $n$ is 13.6 and the average molecular weight is 340. The reaction is carried out at 124°–130° C. for about 5 hours. The condensation product, designated D, has an acid number 123 (theory 123) and a saponification number 123 (theory 123).

E. Equimolar quantities of citric acid and Alfonic 1412–40 are reacted at 125°–140° C. for about 3 hours. Water of condensation is removed through a condenser and a trap. The condensation product has an acid number 215 (theory for monoester 218) and a saponification number 108 (theory 109). The product is designated Product E.

F. Example D is repeated using equimolar quantities of malic acid and Neodol 23–3 which is a mixture of alcohols having the formula C$_n$H$_{2n+1}$(OCH$_2$CH$_2$)$_3$OH in which $n$ has an average value of 12.7 and the alcohols have average molecular weight of 327. The reaction is carried out at 125°–140° C. for about 4 hours. The condensation product, designated F, has an acid number 115 (theory 127) and a saponification number 138 (theory 127).

G. React 35.4 parts (0.3 mole) of succinic acid and 102 parts (0.3 mole) of Alfonic 1412–40 for about 7 hours with heating to a maximum temperature of 170° C. The finished product has a saponification number of 126 (theory 129) indicating substantially complete esterification of the alcohol.

H. React 43.5 parts (0.3 mole) of adipic acid and 102 parts (0.3 mole) of Alfonic 1412–40 for about 6 hours at a temperature of 175°–185° C. The finished product has an acid number of 118 indicating about one-half of COOH of the adipic acid reacted (theory 121).

I. React 177 parts (1.20 moles) of phthalic anhydride and 425 parts (1.32 moles) of AE-1214-3 (same formula, n=12.7, m.w.=322) for about 6 hours at 130°–170° C. The saponification number is 112, indicating that it is substantially the monoester (theory for monoester 112).

J. React one mole maleic anhydride (commercial briquettes) and 1.1 mole Alfonic 1412-40 at temperature 140° C. for three hours. The product has acid number 107 (theory 108) and saponification number 132 (theory 131).

K. React one mole maleic anhydride and 1.1 mole AE-1214-3 at about 140° C. for four hours. The product is slightly yellow viscous liquid having acid number 114 (theory 112) and saponification number 138 (theory 137).

In carrying out the condensation of a polycarboxylic acid with or without hydroxyl groups, and an alkylpolyoxyethylene alcohol, the molar ratio of alcohol to acid can vary in the range from about 2/1 to about 1/1 in the case of tribasic acid. When condensing with a dibasic acid, the molar ratio does not have to be exactly 1/1, a slight excess up to about 25% of either of the reactants is permissible. As the alcohol is usually more volatile than the acid, a slight excess of the alcohol is usually preferred.

II. TESTS IN LABORATORY TEST APPARATUS

The corrosion tests are carried out in laboratory heat exchanger units designed and built for the test purpose. The heat exchanger has a single tube made of SAE 1010 mild steel and having ½ inch outside diameter. This tube is enclosed in a glass jacket equipped with inlet and outlet arms, about 1 foot apart. The tube is steam-heated on the inside and cooled on the outside by recirculating water which is circulated from a reservoir through the jacket and then back to the reservoir for cooling. Water temperature in the reservoir is maintained at about 45° C. The steam supply to the tube is regulated to maintain a temperature rise of one degree C. from entry to exit of the cooling water in the jacket. The rate of flow of cooling water in the jacket is kept at about 3 linear feet per second. Preweighed coupons of SAE 1010 steel measuring 3 inches × ⅜ inches × 1/16 inches are immersed in the path of the recirculating water. The test is run continuously for one week at the end of which the coupons are removed, cleaned by a conventional procedure and reweighed. The rate of corrosion, calculated from the measured weight loss and the time for the test, is expressed in terms of mils per year (mpy). After each test, the heat exchanger tube is disassembled, examined, and the solids deposited on its surface are dried, removed and weighed by a standard procedure. The weight of deposit removed, expressed directly in milligrams, indicates a comparative value of the actual formation of scale on the surface.

The cooling water used for each test is of controlled hardness and is made by adding weighed quantities of chemicals to deionized water. The characteristics of the cooling water are as follows:

| | |
|---|---|
| Total hardness, as ppm $CaCO_3$ | 550 |
| Ca hardness, as ppm $CaCO_3$ | 410 |
| Mg hardness, as ppm $CaCO_3$ | 140 |
| $SiO_2$, ppm | 35 |
| Methyl orange alkalinity | 60 |
| Chloride, ppm | 300 |
| Sulfate, ppm | 300 | pH is maintained at about pH7 throughout the test.

Tests of several compounds selected from the defined class of additives, in a use according to the invention, are carried out in the laboratory test apparatus as described above. In each test a measured amount of the selected compound is added to the cooling water to make the concentration in ppm shown in Table 1 for the test. In some of the tests, measured amounts of a selected oil and a selected surfactant are also added to make the concentration shown in ppm of oil and surfactant in the cooling water. When an oil is used, it is preferably mixed with the surfactant and with the partial ester-acid compound, in the relative proportions to be used for the test, before the mixture is added into the water. This pre-mixing procedure is followed for all of the examples described in Table 1 in which an oil was used. Such pre-mixing of the partial ester and the oil before addition is a preferred practice but the components can be added separately to the circulating water if one wishes to do so. To illustrate certain improvements that are obtained by the invention, several control or comparative tests are made which do not embody the invention, and those tests are also recorded in Table 1 as basis for comparison. Several light hydrocarbon oils of various types are used for these tests and they are described in Table 1 by the tradenames under which they were obtained. All of these are light mineral oil petroleum fractions. Other oils such as other dispersible hydrocarbon oils or vegetable oils would be suitable. The surfactant used in the examples to disperse the oil was Surfonic N-95, nonionic adduct of nonylphenol with ethylene oxide. Other suitable dispersants that can be used with the oil include other ethylene oxide adducts of fatty acids or of alkyl phenols or of polyamines, or the like. Nonionic surfactants are preferred. In some instances the oil will be adequately dispersed by the inhibitor additive of the invention without need for a surfactant as dispersing agent.

TABLE 1

| | Additives (Concentration ppm in Cooling Water) | | | | | Test Results | |
|---|---|---|---|---|---|---|---|
| | Partial Ester Product from the Preparation Indicated (or Other Additives) | | Oil | | Surfactant- Surfonic N-95 | Corrosion Rate | Deposit |
| Test No. | Additive | ppm | (Tradename) | ppm | ppm | mpy | mg |
| Control 1 | None | | None | | None | 70 | 5000 |
| Control 2 | None | | (Fractol A) 50 | 10 | 48 | 3400 | |
| Comparative 3 | (Citric Acid) | 50 | None | | None | 45.2 | 4202 |
| Comparative 4 | (Citric Acid) | 50 | (Fractol A) | 50 | 10 | 45.8 | 2775 |
| Example 5 | A | 100 | None | | None | 2.5 | 202 |

TABLE 1-continued

| | Additives (Concentration ppm in Cooling Water) | | | | | Test Results | |
|---|---|---|---|---|---|---|---|
| | Partial Ester Product from the Preparation Indicated (or Other Additives) | | Oil | | Surfactant- Surfonic N-95 | Corrosion Rate | Deposit |
| Test No. | Additive | ppm | (Tradename) | ppm | ppm | mpy | mg |
| Example 6 | A | 67 | (Fractol A) | 33 | 10 | 2.5 | 7.2 |
| Example 7 | A | 67 | (Carnation Oil) | 33 | 10 | 2.5 | 8.4 |
| Example 8 | B | 50 | (Fractol A) | 50 | 10 | 2.2 | 89 |
| Example 9 | C | 100 | None | | None | 6.1 | 2116 |
| Example 10 | C | 50 | (Fractol A) | 50 | 10 | 2.0 | 20 |
| Example 11 | D | 50 | (Semtol-70) | 50 | None | 1.5 | 39 |
| Example 12 | E | 75 | (Mentor 28) | 75 | None | 3.4 | 141 |
| Example 13 | F | 50 | (Semtol-70) | 50 | None | 2.3 | 9.0 |
| Example 14 | F | 50 | (Coray-37) | 50 | (Surfonic N150) 5 ppm | 1.4 | 6.0 |
| Example 15 | G | 50 | (Fractol A) | 50 | 10 | 3.3 | 0.0 |
| Example 16 | H | 50 | (Fractol A) | 50 | 10 | 3.9 | 27 |
| Example 17 | G | 75 | (Mentor 28) | 75 | None | * 3.8 | 112 |
| Example 18 | I | 50 | (Mentor 28) | 50 | 10 | 2.1 | 8.8 |
| Example 19 | J | 50 | (Mentor 28) | 50 | 10 | 2.1 | 4.3 |
| Example 20 | K | 50 | (Coray 37) | 50 | 10 | 2.3 | 1.8 |
| Example 21 | K | 50 | (Coray 37) | 50 | None | 1.2 | 0.0 |
| Example 22 | K | 75 | (Mentor 28) | 75 | None | * 2.8 | 162 |
| Example 23 | A | 33 | (Fractol A) | 75 | 10 | 2.5 | 30 |
| Example 24 | A | 33 | (Fractol A) | 75 | None | 2.7 | 810 |

* the water used in Examples 17 & 22 had twice the mineral content of the standard water described.

For comparison, to point out the invention, two half esters not having the solubilizing group were prepared by conventional esterification and tested. These were the half ester of malic acid with dodecanol and the half ester of malic acid with Alfol 1618. In a test like the one described above these two half esters were found to be insoluble in the cooling water used and hence not useful for use in a circulating water system. These half esters have the anchoring and the oleophilic moieties but do not have the solubilizing polyoxyalkylene group. Alfol 1618 is a mixture of alkanols having 16 to 18 carbon atoms.

In the foregoing examples, all of the additive compounds that were used in accordance with the invention comprised the solubilizing group — $(CH_2CH_2O-)_m$ wherein $m$ is an average value about three. Other compounds of the class described having polyoxyethylene groups with average values of $m$ from about 2 to about 11 have been tested and most were found to have at least some inhibiting effect with respect to inhibition of corrosion or scale or both, by comparison with the control tests. By far the best results, however, are obtained with additive compounds of the class defined wherein $m$ is about 3, as in the examples described in Table 1. Compounds of the class described having another polyoxyalkyl group such as polyoxyisopropylene instead of polyoxyethylene as the solubilizing moiety can be used according to the invention.

The oleophilic moiety in compounds according to the invention comprises a hydrocarbon having 8 to 20 carbon atoms. In the examples above the invention is described using the most preferred alcohols having terminal alkyl groups containing 10 to 14 carbon atoms but other additive compounds having terminal hydrocarbon groups having 8 to 20 carbon atoms, such as nonylphenyl, alpha butyl benzyl, p-butyl benzyl, ethyl cyclohexyl, $C_8$ to $C_{20}$ alkyl, octadecenyl, undecenyl and the like. These can be prepared for use in the invention by ethoxylation of the alcohol that corresponds to the selected hydrocarbon group, by conventional ethoxylation to make the polyethoxy alcohol.

The product, in turn, is esterified with a polycarboxylic acid to make an additive compound.

The acid moiety in the molecule may be selected from the organic dicarboxylic and tricarboxylic acids, including oxalic acid, alkyl dicarboxylic acids such as malonic, succinic, glutaric, adipic acids and the like, unsaturated aliphatic dicarboxylic acids such as maleic, citraconic, itaconic, acetylenedicarboxylic acids, tricarballylic acid, and further including hydroxy and dihydroxy dicarboxylic and tricarboxylic acids such as citric, malic, tartaric acids and the like, and further including the aromatic dicarboxylic acids such as phthalic acid, trimesitinic acids and the like.

In the detailed examples above the compounds used as inhibitor additives were all compounds of the formula described wherein X is COOM. In addition, one can use compounds of that formula wherein X is sulfonate. For example, p-sulfobenzoic acid, sodium salt is condensed with an ethoxylated alkyl-or alkaryl alcohol to produce a partial ester according to the formula described above
wherein
X is sulfonate
Y is p-benzylene
M is sodium, etc.

Similarly an inhibitor additive compound is prepared by first transesterifying an ethoxylated alcohol of the class defined with an unsaturated aliphatic monocarboxylate ester to obtain the ether alcohol ester of the unsaturated acid. For example, methyl acrylate is transesterified with an alkyl ether alcohol such as Alfonic 1412–40 to make the acrylate ester of the alkyl ether alcohol. Phosphorous acid is then reacted with the acrylate ester in presence of a radical source such as ultraviolet or X-ray radiation or azobisisobutyronitrile, followed by neutralization with sodium hydroxide. In the latter reactions, the phosphono radical is added at the unsaturated bond and then neutralized, producing the 3-phosphonopropionate (sodium salt) ester of the alkyl ether alcohol, having the formula described above
wherein
X is phosphonate
Y is ethylene
M is sodium, etc.

The sulfonate and phosphonate acid esters prepared as described and used as additives in a circulating water system as described are effective as corrosion and scale inhibitors.

In the examples the optimum concentrations of the preferred additives were used but the invention contemplates the use of any of the defined class of additives in any concentration which will effectively reduce corrosion and scale in metal parts of the system. Such effective concentrations will usually fall in the range from about 10 ppm to about 500 ppm. Similarly the effective concentrations of dispersed oil in the circulating water, when used in combination with a selected additive compound of the class described, will usually be in the range from about 10 to about 500 ppm (by wt.).

The mixtures of additive compound and oil for simultaneous addition to the circulating water are conveniently prepared by simple mechanical mixing of the components. When needed, there is added enough of a surfactant dispersing agent such as Surfonic N-95, Surfonic N-150, or Tetronic 504 or the like in the mixture to ensure dispersion of the oil into the water as the mixture is added to the circulating water system. The dispersing agent is not always needed. When used, up to about 25 ppm of the dispersant in the circulating water will usually be sufficient for the purpose.

In the examples, the additive compounds were used as the half acid esters but they are equally effective when added as salts, for example, as the sodium salts, of the half acid esters. Any soluble, ionizable salt will be suitable. The salts can be conveniently prepared by conventional neutralization with a selected base or by other suitable reaction of the half acid ester to produce the salt.

Waters treated with additives of the present invention may vary with respect to pH value within a wide range, e.g., waters having pH 6 to 9. For several practical reasons it is most convenient and most economical to keep the pH value of the circulating water in a range between pH 6.5 and pH 8.5, and the additives of the invention are effective in waters having any pH value in the ranges described.

The corrosion and scale inhibiting agents described for use in the present invention can be used in combination with other additive chemicals and agents that are commonly used for water treatment. For example, they may be used in circulating water that also has been treated with dispersants such as polyacrylic acid, sodium polyacrylate, hydrolyzed polyacrylamide, nitrilo-tris-acetic acid, or with flocculants such as polyacrylamide copolymers of acrylamide and acrylic acid, with other treating agents such as sodium polyphosphate, amino-tris(methylenephosphonic acid), 1-hydroxy ethylidene-1,1-diphosphonic acid, phosphorylated polyols, and the like.

The compositions described for use as additives for inhibiting corrosion and scale are compatible with most of the common biocides, such as chlorine, methylene-bis-thiocyanate, tri-butyl-tin-oxide complex, and the like which are also used for water treatment in circulating water systems. These new additives are also compatible with most of the corrosion inhibitors that are used in such systems to protect copper or copper alloys in the system such as benzotriazole, 2-mercaptobenzothiazole, and the like. The invention contemplates the use of the new additives for corrosion and scale control in water systems that may also contain one or several other additives of different kinds which have been added for any of several other purposes.

We claim:

1. An additive composition for inhibiting corrosion and scale on ferrous metal parts of a circulating water system by addition of said additive to said water in inhibiting amounts, said composition consisting essentially of a mixture of: a) the partial ester condensation product of an alcohol having the formula $$R(O-CH_2CH_2)_mOH$$

wherein
R is hydrocarbon having 8 to 20 carbon atoms and $m$ is 2 to 4, with an acid selected from citric, malic, tartaric, succinic, adipic, phthalic and maleic acids, wherein one carboxyl group in said acid is unesterified and; b) from more than one to about two parts by wt. of a light hydrocarbon oil or vegetable oil per part of said condensation product and sufficient amount of a surfactant for dispersing said oil in water.

* * * * *